US010489202B2

(12) United States Patent
Cherniavsky et al.

(10) Patent No.: US 10,489,202 B2
(45) Date of Patent: Nov. 26, 2019

(54) SYSTEM AND METHODS FOR IMPLEMENTING CONTROL OF USE OF SHARED RESOURCE IN A MULTI-TENANT SYSTEM

(71) Applicant: NetSuite Inc., San Mateo, CA (US)

(72) Inventors: John Cherniavsky, San Jose, CA (US); Sean Fay, San Francisco, CA (US); Xi (Scott) Liu, Saratoga, CA (US); Theodore Ray Rice, Boulder, CA (US)

(73) Assignee: NETSUITE INC., San Mateo, CA (US)

( * ) Notice: Subject to any disclaimer, the term of this patent is extended or adjusted under 35 U.S.C. 154(b) by 163 days.

(21) Appl. No.: 14/945,286

(22) Filed: Nov. 18, 2015

(65) Prior Publication Data

US 2017/0235606 A1     Aug. 17, 2017

Related U.S. Application Data

(60) Provisional application No. 62/098,056, filed on Dec. 30, 2014.

(51) Int. Cl.
*G06F 9/46*     (2006.01)
*G06F 9/50*     (2006.01)

(52) U.S. Cl.
CPC .................................. *G06F 9/5011* (2013.01)

(58) Field of Classification Search
CPC .................................................... G06F 9/5011
See application file for complete search history.

(56) References Cited

U.S. PATENT DOCUMENTS

| 7,231,445 B1* | 6/2007 | Aweya | G06Q 10/00 709/219 |
| 2013/0073884 A1* | 3/2013 | Ulmer | G06F 1/3203 713/320 |
| 2015/0199148 A1* | 7/2015 | Hrischuk | G06F 3/0611 711/114 |
| 2015/0261290 A1* | 9/2015 | Brown | G06F 1/3293 713/323 |
| 2016/0080484 A1* | 3/2016 | Earl | H04L 67/1031 709/226 |
| 2016/0300162 A1* | 10/2016 | McManus | G06Q 10/02 |

* cited by examiner

*Primary Examiner* — James J Lee
(74) *Attorney, Agent, or Firm* — Kraguljac Law Group, LLC

(57) ABSTRACT

Systems, apparatuses, and methods for preventing the use of a shared resource (such as a database) by a user or group of users from causing other users to experience unsatisfactory or unreliable access to that resource or to related, impacted resources (such as a communications network or processor). In some embodiments, the invention is directed to systems, apparatuses, and methods that may be implemented in a multi-tenant system in order to prevent a single user or the users associated with an account from degrading the system performance experienced by other users, either by intentional or inadvertent misuse of a shared database, and to prevent an overload condition from causing the system or database to fail abruptly.

19 Claims, 8 Drawing Sheets

CPU_IDLE Component

GC_PCT Component

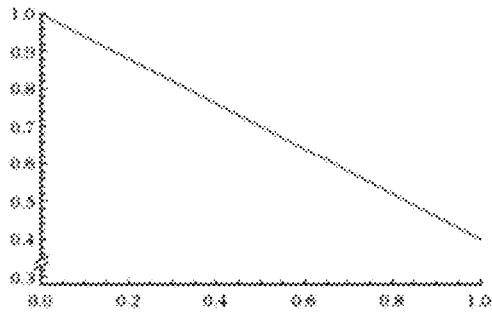
Figure 4(e) SESSION_COUNT Component
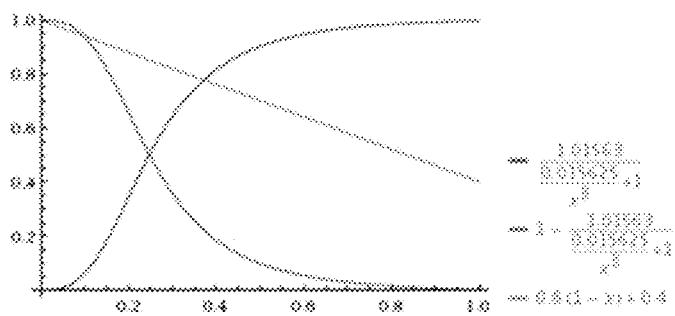
Figure 4(f) ALL Components

SYSTEM AND METHODS FOR IMPLEMENTING CONTROL OF USE OF SHARED RESOURCE IN A MULTI-TENANT SYSTEM

CROSS REFERENCE TO RELATED APPLICATION

This application claims the benefit of U.S. Provisional Application No. 62/098,056, entitled "System and Methods for Implementing Control of Use of Shared Resource in a Multi-Tenant System," filed Dec. 30, 2014, which is incorporated herein by reference in its entirety (including the Appendix) for all purposes.

BACKGROUND

One of the difficulties in managing or administrating a data processing or computing system is properly and automatically allocating resources (such as data storage and computational processes) so that users receive access to sufficient resources to perform their tasks, but do so in a way that does not unreasonably degrade the resources available to others. An aspect of this problem that is relevant to the operation of a multi-tenant system is that of properly controlling the use of the database, which is a resource that is shared as part of the system. Unfortunately, a shared database may become used by a subset of users in a way that degrades the system performance experienced by others of the users. This is an example of "the tragedy of the commons" doctrine, in which some users will take as much of the available resources from a service as they can, because it's there and they are unaware of (or do not care about) the impact on other users. Even if not initiated by a user directly or intentionally, an integration with or interface between a user's systems and a shared resource may behave improperly and result in rapidly making requests to the shared resource, thereby potentially impacting other users.

Conventional approaches to managing a shared resource typically rely on operating in a default mode in which it is understood that a server may at least temporarily run out of resources when a relatively large number of resource requests arrive (or a relatively high rate of requests occurs). This may be acceptable (at least in principle) because the server makes a best effort to service the requests, but the situation is not practical because it can happen relatively suddenly, with a resulting sustained service degradation until the load recedes. Another conventional approach is one based on prioritization of requests for resource access (either as determined by a static or a dynamic process); however, a problem with this type of approach is that it typically starves lower priority clients and they do not receive the resource access they require for effective operation. A further conventional approach is one based on static allocation of a resource's capacity to different accounts, types of transactions, etc. As with other approaches, this fails to satisfy the needs of a dynamic operating environment and may result in allocating access to a resource in an inefficient or suboptimal manner.

Embodiments of the invention are directed toward overcoming the disadvantages and limitations of conventional shared resource management methods and solving these and other problems individually and collectively. Specifically, in some embodiments, the invention is directed to systems, elements, and methods that may be implemented in a multi-tenant system in order to prevent a single user from degrading the performance of the system for other users by misuse of a shared database, and to prevent an overload condition from causing the system or database to fail abruptly.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, essential, or required features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention are directed to systems, apparatuses, and methods that may be implemented in a multi-tenant system in order to prevent a single user from degrading the performance experienced by other users by misuse of a shared database, and to prevent an overload condition from causing the system or database to fail abruptly.

In one embodiment, the invention is directed to a method of protecting a shared resource in a data processing system, where the method includes:

receiving a request, wherein responding to the request requires use of the shared resource;

determining if a previously established sleep period for the shared resource has expired;

if the previously established sleep period has expired, then determining a health status of the shared resource;

determining if the health status is sufficient to permit responding to the request;

if the health status is not sufficient to permit responding to the request, then determining an appropriate sleep period for the shared resource;

initating a sleep state for the shared resource for a period substantially equal to the determined appropriate sleep period; and exiting the sleep state and responding to the request.

In another embodiment, the invention is directed to a data processing system, where the system includes:

a central data storage element; and an electronic data processor configured to execute a set of instructions, wherein when the instructions are executed, the data processing system is caused to implement a process to receive a request, wherein responding to the request requires use of a shared resource;

determine if a previously established sleep period for the shared resource has expired;

if the previously established sleep period has expired, then determine a health status of the shared resource;

determine if the health status is sufficient to permit responding to the request;

if the health status is not sufficient to permit responding to the request, then determine an appropriate sleep period for the shared resource;

initate a sleep state for the shared resource for a period substantially equal to the determined appropriate sleep period; and exit the sleep state and respond to the request.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which:

FIG. 4(c) through FIG. 4(f) are graphs illustrating the behavior of certain aspects of a data processing platform or system when operated in conjunction with an embodiment of the inventive shared resource access control process.

Note that the same numbers are used throughout the disclosure and figures to reference like components and features.

DETAILED DESCRIPTION

Figure 1:
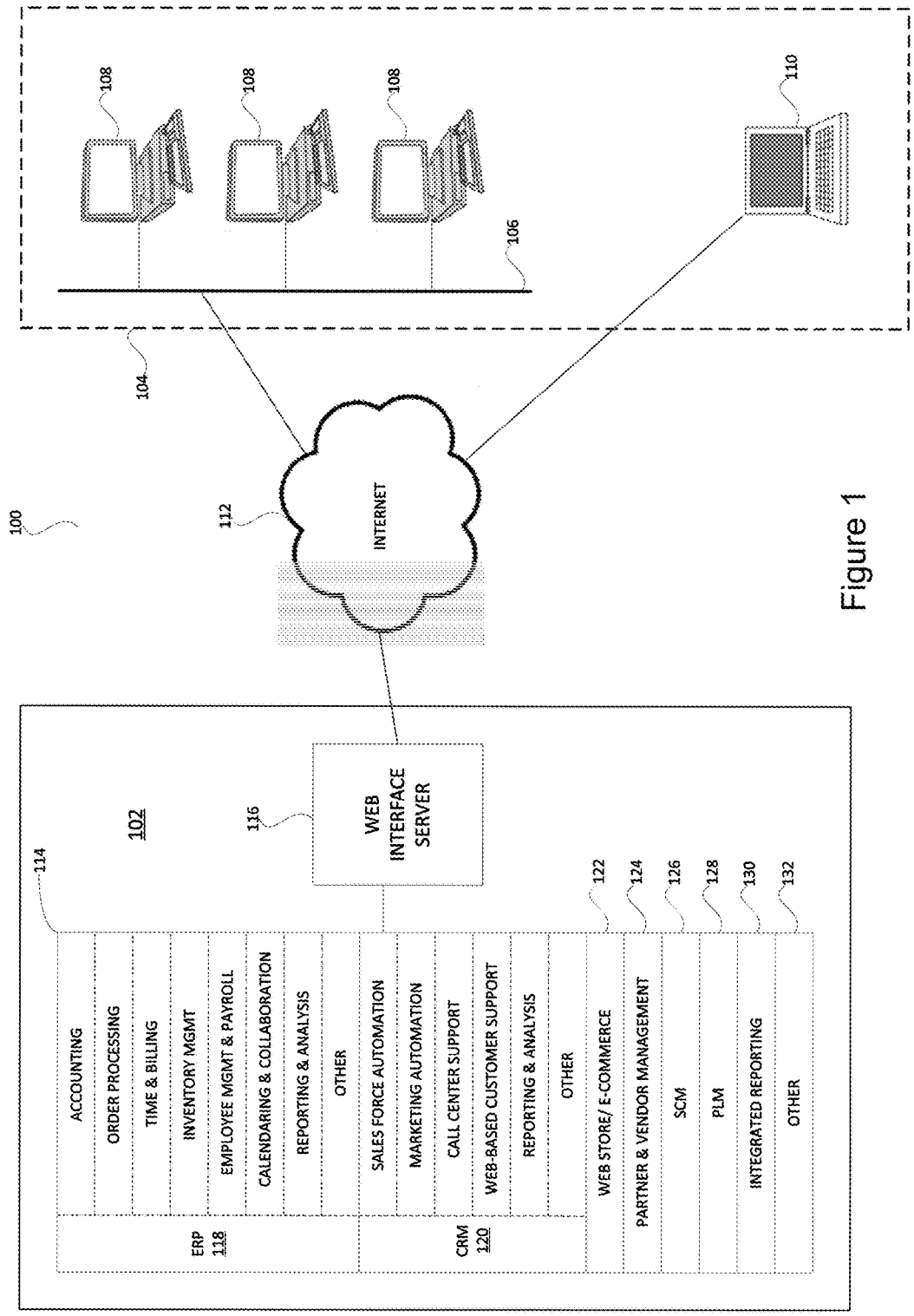
FIG. 1 is a diagram illustrating a system 100, including an integrated business system 102 and an enterprise network 104 in which an embodiment of the invention may be implemented.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that are part of a client device, server, network element, or other form of computing or data processing device/platform and that are programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

In some embodiments, the invention is directed to systems, apparatuses, and methods for preventing the use of a shared resource (such as a database) by a user or group of users from causing other users to experience unsatisfactory or unreliable access to that resource or to related, impacted resources (such as a communications network or processor). In some embodiments, the invention is directed to systems, apparatuses, and methods that may be implemented in a multi-tenant system in order to prevent a single user or the users associated with an account from degrading the system performance experienced by other users, either by intentional or inadvertent misuse of a shared database, and to prevent an overload condition from causing the system or database to fail abruptly.

As noted, in some embodiments, the invention may be implemented in the context of a multi-tenant, "cloud" based environment (such as a multi-tenant business data processing platform), typically used to develop and provide web based services for end users. This exemplary implementation environment will be described with reference to FIGS. 1-3. Note that embodiments of the invention may also be implemented in the context of other computing or operational environments or systems, such as for an individual business data processing system, a private network used with a plurality of client terminals, a remote or on-site data processing system, a distributed processing or data storage system, another form of client-server architecture, etc.

Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher level cloud services typically focus on one or more well-defined end user applications, such as business oriented applications. Some high level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, employee management/payroll, human resources management, and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system may include (but are not required to include, nor limited to only including): sales force automation (SFA), marketing campaign automation, contact list, call center support, and web-based customer support, as well as reporting and analysis capabilities relating to these functions. With differing levels of overlap with ERP/CRM initiatives and with each other, efforts have also been directed toward development of increasingly integrated partner and vendor management systems, web store/eCommerce systems, product lifecycle management (PLM) systems, and supply chain management (SCM) systems.

FIG. 1 is a diagram illustrating a system 100, including an integrated business system 102 and an enterprise network 104 in which an embodiment of the invention may be implemented. Enterprise network 104 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 104 is represented by an on-site local area network 106 to which a plurality of personal computers 108 are connected, each generally dedicated to a particular end user (although such dedication is not required), along with an exemplary remote user computer 110 that can be, for example, a laptop computer or tablet computer of a traveling employee having internet access through a hotel, coffee shop, a public Wi-Fi access point, or other internet access method. The end users associated with computers 108 and 110 may also (or instead) possess an internet-enabled smartphone or other electronic device (such as a PDA) having wireless internet access or other synchronization capabilities. Users of the enterprise network 104 interface with the integrated business system 102 across the Internet 112 or another suitable communications network or combination of networks.

Integrated business system 102, which may be hosted by a dedicated third party, may include an integrated business server 114 and a web interface server 116, coupled as shown in FIG. 1. It is to be appreciated that either or both of the integrated business server 114 and the web interface server 116 may be implemented on one or more different hardware systems and components, even though represented as singular units in FIG. 1. In one embodiment, integrated business server 114 comprises an ERP module 118 and further comprises a CRM module 120. In many cases, it will be desirable for the ERP module 118 to share methods, libraries, databases, subroutines, variables, etc., with CRM module 120, and indeed ERP module 118 may be intertwined with CRM module 120 into an integrated Business Data Processing Platform (which may be single tenant, but is typically multi-tenant).

The ERP module 118 may include, but is not limited to, a finance and accounting module, an order processing module, a time and billing module, an inventory management and distribution module, an employee management and payroll module, a calendaring and collaboration module, a reporting and analysis module, and other ERP-related modules. The CRM module 120 may include, but is not limited to, a sales force automation (SFA) module, a marketing automation module, a contact list module (not shown), a call center support module, a web-based customer support module, a reporting and analysis module, and other CRM-related modules. The integrated business server 114 (or multi-tenant data processing platform) further may provide other business functionalities including a web store/eCommerce module 122, a partner and vendor management module 124, and an integrated reporting module 130. An SCM (supply chain management) module 126 and PLM (product lifecycle management) module 128 may also be provided. Web interface server 116 is configured and adapted to interface with the integrated business server 114 to provide one or more web-based user interfaces to end users of the enterprise network 104.

The integrated business system shown in FIG. 1 may be hosted on a distributed computing system made up of at least one, but likely multiple, "servers." A server is a physical computer dedicated to supporting one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service that a server offers it could be referred to as a database server, file server, mail server, print server, web server, etc. A web server is a most often a combination of hardware and the software that helps deliver content, commonly by hosting a website, to client web browsers that access the web server via the Internet.

Figure 2:
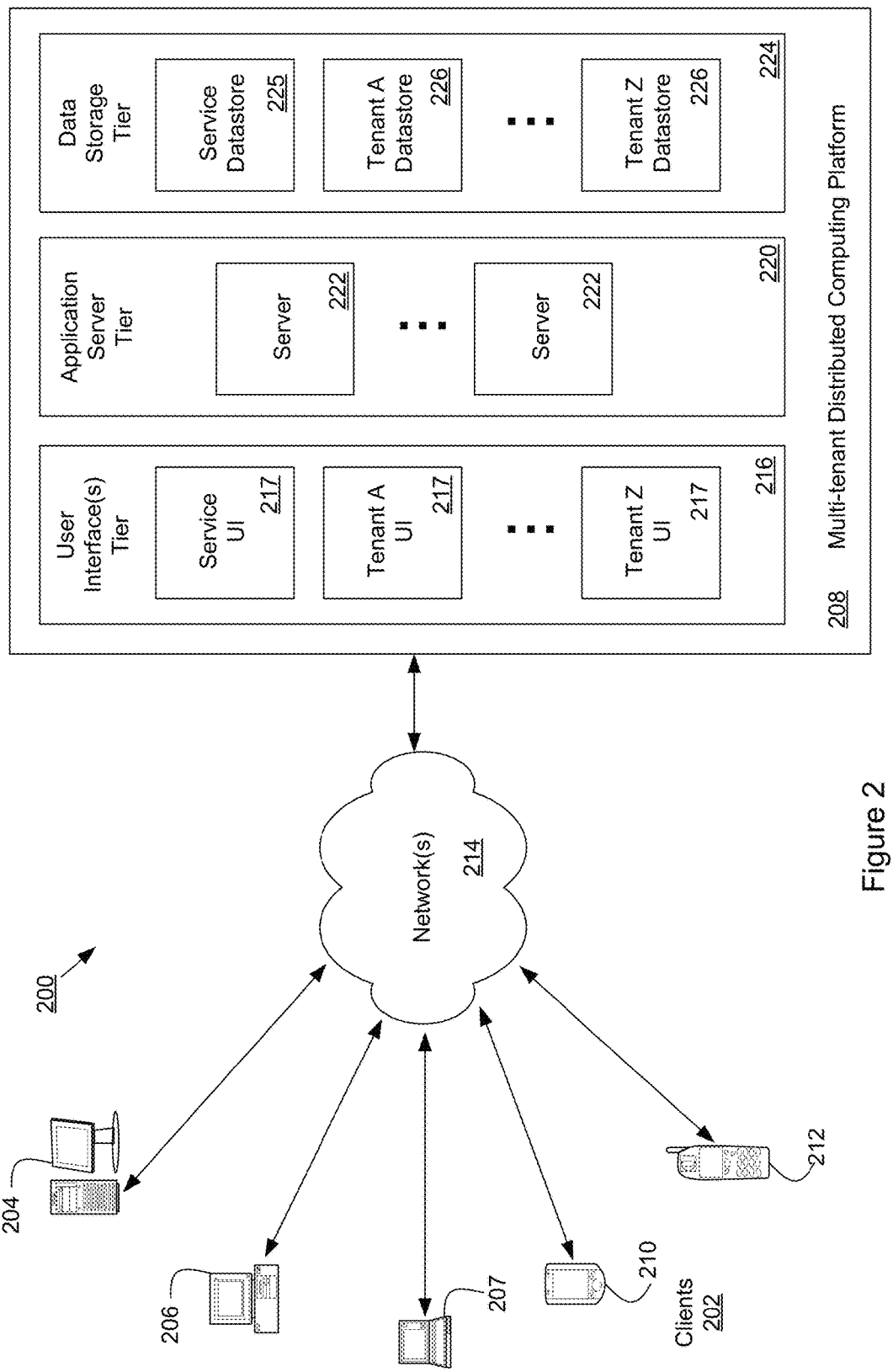
FIG. 2 is a diagram illustrating elements or components of an example operating environment in which an embodiment of the invention may be implemented.

FIG. 2 is a diagram illustrating elements or components of an example operating environment 200 in which an embodiment of the invention may be implemented. As shown, a variety of clients 202 incorporating and/or incorporated into a variety of computing devices may communicate with a distributed computing service/platform 208 through one or more networks 214. For example, a client may incorporate and/or be incorporated into a client application (e.g., software) implemented at least in part by one or more of the computing devices. Examples of suitable computing devices include personal computers, server computers 204, desktop computers 206, laptop computers 207, notebook computers, tablet computers or personal digital assistants (PDAs) 210, smart phones 212, cell phones, and consumer electronic devices incorporating one or more computing device components, such as one or more electronic processors, microprocessors, central processing units (CPU), or controllers. Examples of suitable networks 214 include networks utilizing wired and/or wireless communication technologies and networks operating in accordance with any suitable networking and/or communication protocol (e.g., the Internet).

The distributed computing service/platform (which may also be referred to as a multi-tenant business data processing platform) 208 may include multiple processing tiers, including a user interface tier 216, an application server tier 220, and a data storage tier 224. The user interface tier 216 may maintain multiple user interfaces 217, including graphical user interfaces and/or web-based interfaces. The user interfaces may include a default user interface for the service to provide access to applications and data for a system administrator, user, or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant or platform administrator to administer the tenant's participation in the functions and capabilities provided by the service platform, such as accessing data, causing the execution of specific data processing operations, implementing a desired workflow, etc. Each processing tier shown in the figure may be implemented with a set of computers and/or computer components including computer servers and processors, and may perform various functions, methods, processes, or operations as determined by the execution of a software application or set of instructions. The data storage tier 224 may include one or more data stores, which may include a Service Data store 225 and one or more Tenant Data stores 226.

Each tenant data store 226 may contain tenant-specific data that is used as part of providing a range of tenant-specific business services or functions, including but not limited to ERP, CRM, eCommerce, Human Resources management, or payroll functionality, etc. Data stores may be implemented with any suitable data storage technology, including structured query language (SQL) based relational database management systems (RDBMS).

In accordance with one embodiment of the invention, distributed computing service/platform 208 may be multi-tenant and service platform 208 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include: accounting, order processing, time and billing, inventory management, employee management/payroll, and employee calendaring and collaboration, as well as reporting and analysis capabilities relating to these functions. Another business information system that may be provided as part of an integrated service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system may include: sales force automation (SFA), marketing automation, contact list management, call center support, and web-based customer support, as well as reporting and analysis capabilities relating to these functions. In addition to ERP and CRM functions, a business information system/platform (such as element 208 of FIG. 2) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform.

As noted with regards to FIG. 1, the integrated business system shown in FIG. 2 may be hosted on a distributed computing system made up of at least one, but typically multiple, "servers." A server is a physical computer dedicated to supporting one or more software services or applications intended to serve the needs of the users of other computers in data communication with the server, for instance via a public network such as the Internet or a private "intranet" network. The server, and the services it provides, may be referred to as the "host" and the remote computers and the software applications running on the remote computers may be referred to as the "clients." Depending on the computing service that a server offers it could be referred to as a database server, file server, mail server, print server, web server, etc. A web server is a most often a combination of hardware and the software that helps deliver content (typically by hosting a website) to client web browsers that access the web server via the Internet.

Rather than build and maintain such an integrated business system or platform themselves, a business may utilize systems provided by a third party. Such a third party (i.e., a platform operator, manager, or administrator) may implement an integrated business system/platform as described herein in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users, including customers and employees. Some of those multiple users may have distinct roles or responsibilities within the business or entity. As a result, such users may have a need or preference to utilize certain components of a user interface or other functional aspects of the computing/data processing platform when performing their functions.

In some cases, a tenant may desire to modify or supplement the functionality of an existing platform application by introducing an extension to that application, where the extension is to be made available to the tenant's employees and/or customers. In some cases such an extension may be applied to the processing of one or more types of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as in the case of an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension.

Figure 3:
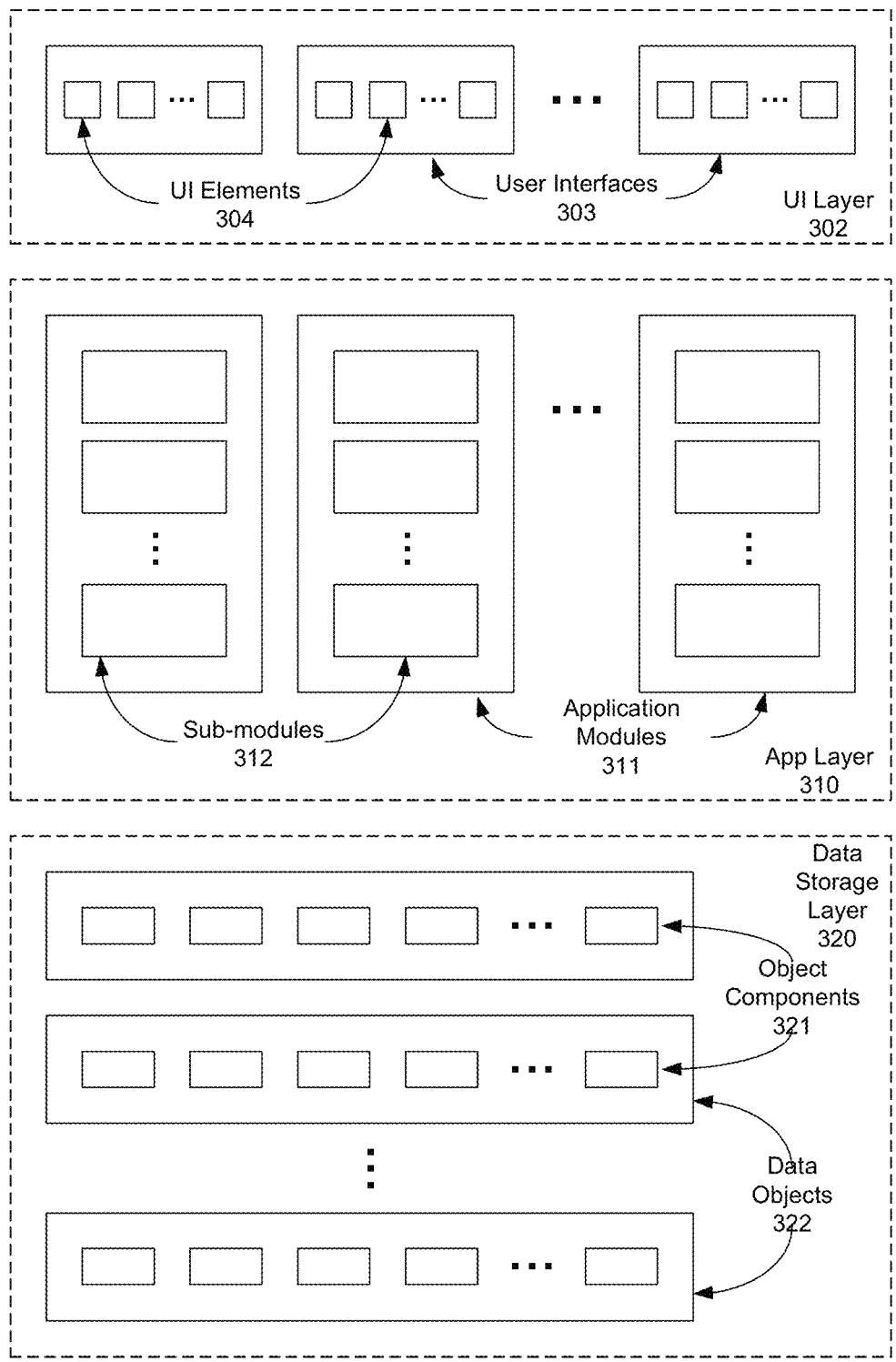
FIG. 3 is a diagram illustrating additional details of the elements or components of the multi-tenant distributed computing service platform of FIG. 2, in which an embodiment of the invention may be implemented.

FIG. 3 is a diagram illustrating additional details of the elements or components of the multi-tenant distributed computing service platform of FIG. 2, in which an embodiment of the invention may be implemented. The software architecture depicted in FIG. 3 represents an example of a software system to which an embodiment of the invention may be applied, i.e., in which it may be implemented. In general, an embodiment of the invention may be implemented by a suitable set of software instructions that are designed to be executed by a suitably programmed processing element (such as a CPU, microprocessor, processor, controller, computing device, server, processing platform, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 3 is a diagram illustrating additional details of the elements or components 300 of the multi-tenant distributed computing service platform of FIG. 2, in which an embodiment of the invention may be implemented. The example architecture includes a user interface layer or tier 302 having one or more user interfaces 303. Examples of such user interfaces include graphical user interfaces and application programming interfaces (APIs). Each user interface may include one or more interface elements 304. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols.

The application layer 310 may include one or more application modules 311, each having one or more sub-modules 312. Each application module 311 or sub-module 312 may correspond to (e.g., be responsible for causing the execution or performance of) a particular function, method, process, or operation that is implemented by the module or sub-module (such as to support or implement an ERP, CRM, eCommerce, financial, or platform administrative feature or function). Such function, method, process, or operation may include those used to implement one or more aspects of the inventive system and methods, such as for:

Generating a user interface to enable a user (such as a systems administrator) to configure one or more parameters for management or control of the use of a shared resource, such as a database, directory, processor, operation, routine, function, process, etc.:

Including, If desired, specifying the resource and selecting and/or defining a desired behavior for a process, function, or operation intended to determine an applicable sleep or time-out period for the resource under a set of one or more conditions (e.g., with reference to a form, function, rule set, etc.);

Including, if desired, conditioning a determination of the health or status of the resource and/or of the sleep or time-out period on a characteristic or characteristics of a request, a source of a request, a state of a system, a data value applicable to the source or a characteristic of the source or the source's business operations, a state or condition of another resource, etc.;

Determining if a request to access/use the shared resource satisfies one or more criteria or characteristics, which if satisfied, indicate that the request is one that is subject to one or more access/usage governance processes;

Determining the relative "health" or other status metric associated with the shared resource (e.g., by reference to a cached value or by querying the resource and obtaining relevant data, and if necessary processing that data to derive or infer the health metric); and Based on one or more of the service request, the resource health, and/or other relevant parameters or characteristics, determining a time period or delay prior to servicing another request for that resource for a specific user or set of users (e.g., in general for all users, for a prescribed group of users, for a prescribed account, for the specific user who submitted the request, etc.).

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 222 of FIG. 2) may include each application module.

Alternatively, different application servers may include different sets of application modules. Such sets may be disjoint or overlapping.

The data storage layer 320 may include one or more data objects 322 each having one or more data object components 321, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 1-3 are not intended to be limiting examples. Alternatively, or in addition, computing environments in which an embodiment of the invention may be implemented include any suitable system that permits users to provide data to, and access, process, and utilize data stored in a data storage element (e.g., a database) that can be accessed directly by a user or remotely over a network. Further example environments in which an embodiment of the invention may be implemented include devices, software applications, systems, processing platforms, apparatuses, or other elements or components that are used to acquire and process business related data and provide the results of that processing to users. Further example environments in which an embodiment of the invention may be implemented include networked systems, elements, or platforms in which responding to user requests involves accessing one or more shared resources, such as a database, a data storage element, a directory, a processing element, a communications/data network, a functionality, a process, etc. Although further examples below may reference the example computing environment depicted in FIGS. 1-3, it will be apparent to one of skill in the art that the examples may be adapted for alternate computing devices, systems, apparatuses, processes, and environments.

FIG. 4(*a*) is a flowchart or flow diagram illustrating the high level operation of an embodiment of the inventive shared resource access control process. As shown in the figure at step or stage 402, in a typical use case a user/account submits a request to a data processing system or platform, where in order to respond to the request, the system or platform needs to access or use a particular shared resource. The user's request may be associated with an account, and the resource may be one or more of a database, a directory, a data storage element, a processing element, a communications/data network, a specific functionality, a process, etc. The system or platform receives the request, typically over a suitable communications network or infrastructure. In response to receiving the request, a process determines if a previously set "sleep" period (or delay) that was set for the shared resource has expired (as suggested by step or stage 403). If a previously set "sleep" period has not expired (as suggested by the flow associated with the "No" branch of step or stage 403), then control is passed pack to step 403. This may be continued until the previously set sleep period has expired. Note that this logic may include a delay based on the value of the previously determined sleep period or based on a default value for the sleep period.

If a previously set "sleep" period has expired (as suggested by the flow associated with the "Yes" branch of step or stage 403), then a suitable process, function, method, or operation determines the "health" level or other form of status of the resource (as suggested by step or stage 404 in the figure). For example, this may be accomplished by reference to (or accessing) health level/status data that is stored in a data storage element (such as a cache associated with the resource, which is regularly updated). In some cases, this determination may be accomplished by generating a query that results in the return of information about the resource health level/status. These options for determining the health level of the shared resource will be described in further detail with reference to FIG. 4(*b*).

Based at least in part on the determined health level/status of the resource, a process then determines if the health of the resource is sufficient to permit responding to the request (step or stage 405). This determination may be based on a threshold value, defined limits, or other suitable decision process, such as one which evaluates the health level of the resource and compares it to one or more other factors, values, or parameters.

The comparison and/or decision process occurring in step 405 may be based on or take into account one or more relevant parameters or factors, including but not limited to (or required to include) a characteristic of the resource (such as its behavior under different loads), a characteristic of the account generating the request (such as its utilization history of the resource or the platform, the priority of the account's users, etc.), a characteristic of the type of request (such as its expected resource utilization), a characteristic of the state of the system of which the resource is a part or element, a specific data value of a business object of an account associated with the user (which may be indicative of the importance of the resource request to the user), or a real-time value of a data processing output of an application used to process business related data for the account (which may serve as a triggering mechanism for a change in priority or expected load calculation, etc.).

If the resource health is determined to be sufficient to permit responding to the request (as suggested by the flow associated with the "Yes" branch of step or stage 405), then the system generates a response to the request, which typically involves accessing and/or using the shared resource (step or stage 406). However, if the resource health is not determined to be sufficient to permit responding to the request (as suggested by the flow associated with the "No" branch of step or stage 405), then a process is used to calculate a desired sleep period or level, or time-out period for the resource (as suggested by step or stage 408).

This process (step 408) may be performed by reference to a table of recommended sleep level values, by evaluation of a specific function or expression, by reference to a set of rules, or by other suitable method. In some embodiments, a specific sleep level function may be accessed and evaluated, where that function may depend on one or more of the resource status, the type of request, the user or account from which the request originates, an aspect of the system or platform status, etc. (i.e., similar to those factors or parameters described with reference to the factors that may impact the availability of a resource based on its health status, as in step 405).

In some embodiments, a sleep level function may incorporate or implement a desired form of "decay" or other behavior. The sleep level function may be of any suitable form, such as a power series, exponential, linear combination, non-linear function, etc. Further, in addition to, or instead of a mathematical function or equation, the sleep level "function" may be a rule set or other decision process. In general terms, the sleep level function uses the resource health level (or expected resource health level) and possibly other relevant characteristics or parameters to determine a suitable amount of "sleep" time before the received request (or another request) is allowed to access or utilize the resource.

After determining an applicable sleep level value or period, the process then directly or indirectly causes the shared resource to enter into a sleep or time-out state (as suggested by step or stage 410). This may occur by triggering an internal process for the resource, causing requests to be blocked, or other suitable process or task. At the conclusion of that time period (or number of cycles, requests, access attempts, etc.), the shared resource exits the sleep state and is available to be used in responding to the request (if it is still pending and not expired) or to another incoming request, as suggested by step or stage 412 (and the control flow back to step 402).

Figure 4A:
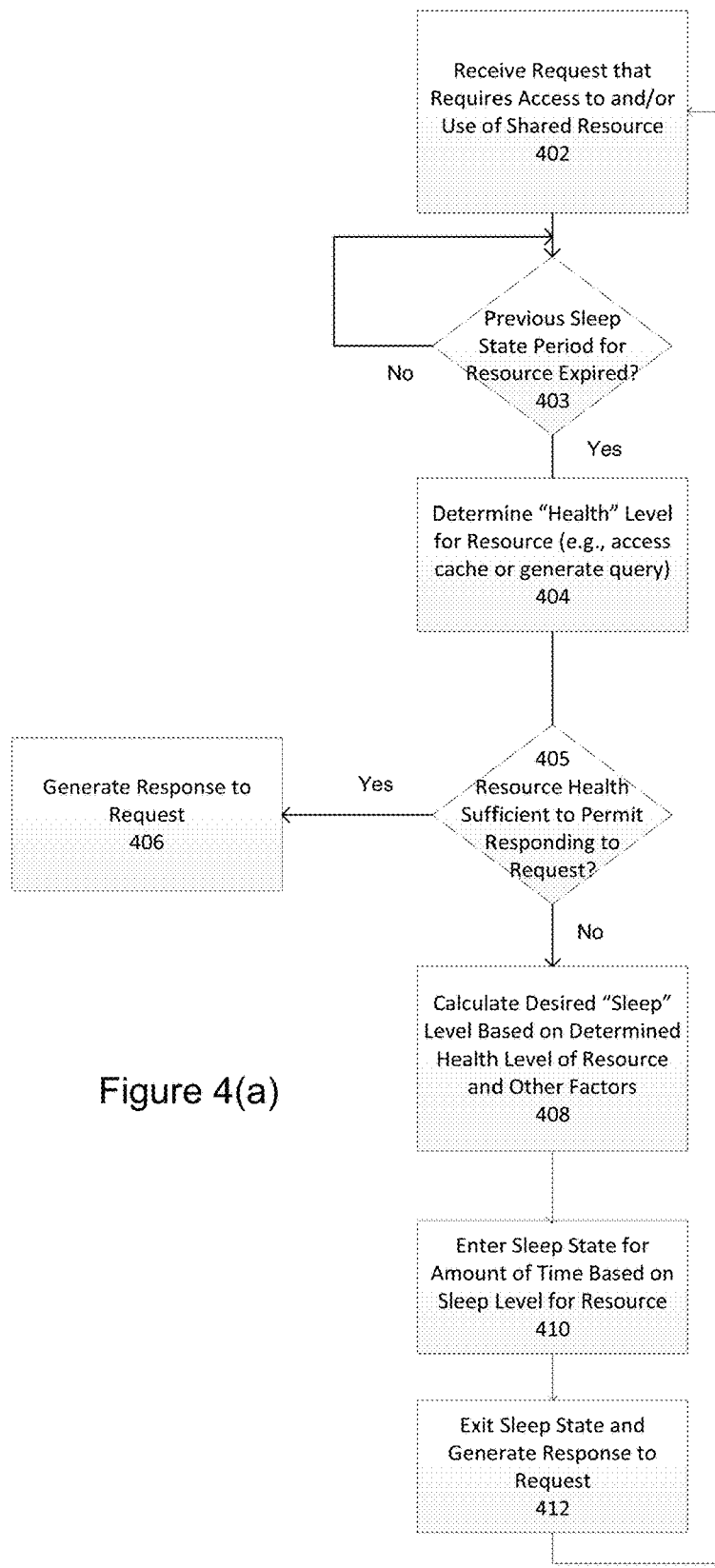
FIG. 4(a) is a flowchart or flow diagram illustrating the high level operation of an embodiment of the inventive shared resource access control process.
Figure 4B:
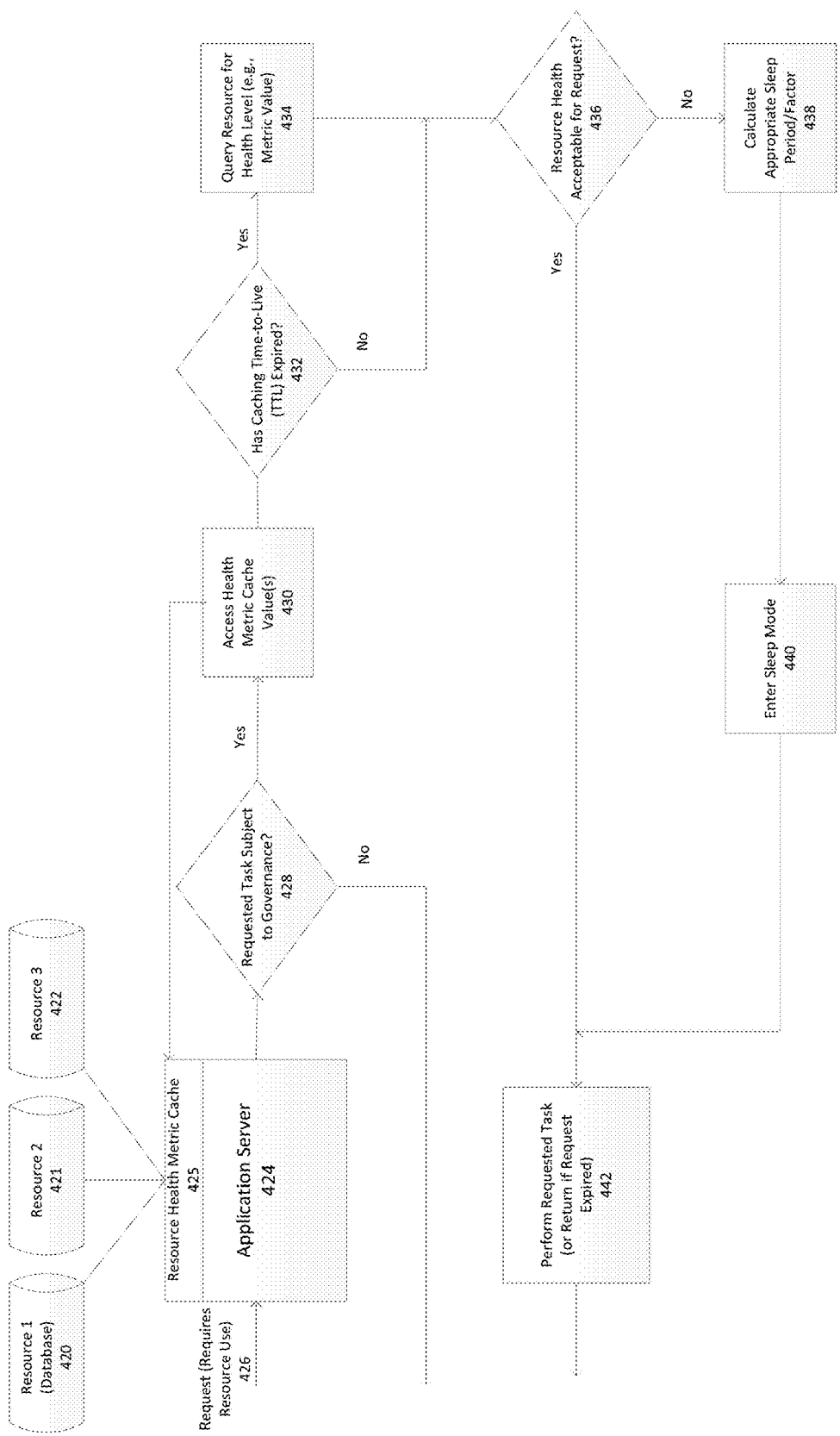
FIG. 4(b) is a flowchart or flow diagram illustrating the operation of a system in which an embodiment of the inventive shared resource access control process has been implemented.

FIG. 4(b) is a flowchart or flow diagram illustrating the operation of a system in which an embodiment of the inventive shared resource access control process has been implemented. As shown in the figure, in one embodiment (such as might be implemented in a data processing system that utilizes a shared database resource), an Application Server 424 receives a Request 426 that requires access to or utilization of a shared resource. Examples of such a shared resource include but are not limited to a Database 420, Shared Resource 421 (such as a directory, file, etc.), or Shared Resource 422 (such as a process, operation, routine, etc.).

In response to receiving the request, it is determined if the task being requested is subject to governance by the inventive process (as suggested by step or stage 428). If the requested task is not subject to such governance, then control returns to the system and not further action with regards to governing access or utilization of the shared resource is taken at that time (as suggested by the "No" branch of step or stage 428). If the requested task is subject to such governance (as suggested by the "Yes" branch of step or stage 428), then control passes to a process 430 that accesses an element 425 in which is stored health metric data for the shared resource (such as a cache or other suitable data storage element).

Note that the determination of whether the requested task is subject to governance may be a function of one or more of the type of task, the estimated burden/load on the shared resource presented by the task, the user or account from which the request originates, an aspect of the operating state of the platform or system which includes the shared resource (such as a rate of increase in requests or an expected level of requests, which may be a function of day, time, or an operational indicator), an observed level of activity on a related resource (such as one that is expected to result in an increased burden/load on the shared resource), or other suitable measure or indicator.

The resource health level element/cache 425 may provide storage for one or more metrics indicative of the relative health of the shared resource. It may be automatically populated by an output of a health determining process that is executed on a regular basis, in response to a specific instruction (as will be described with reference to step or stage 434), or by another suitable process. The metric may be a number, a range of values, a threshold value, an error measure, an equation or function, or other suitable measure or indicator.

Next, the process determines if the health metric data retrieved from the cache 425 is still valid. This is accomplished by determining if the time-to-live (TTL) of the cache data has expired (as suggested by step or stage 432). The TTL value for the cache data may be a fixed number, variable quantity, or other suitable measure. It may be set by a system administrator, account user, or as a result of a separate process that takes into account one or more relevant parameters (such as system load, expected load, account usage, etc.).

If the TTL for the accessed health metric data has expired (as suggested by the "Yes" branch of step or stage 432), then the shared resource is queried or otherwise caused to provide an indication of its health level, as suggested by process 434. For example, a suitable query may cause the execution of a process that determines a health value or other metric for the shared resource by accessing certain data related to the resource's operational state, deriving or computing one or more indicia, etc. Control then passes to step or stage 436, where a process determines if the resource health value/level is acceptable for servicing the request. Note that if at step or stage 432, it is determined that the TTL for the accessed health metric data has not expired (as suggested by the "NO" branch of step or stage 432), then control is passed to step or stage 436.

At step or stage 436, it is determined if the resource health value/level is sufficient to permit the request to be serviced by accessing or otherwise utilizing the resource. This may involve comparing the resource health value/level to a threshold value, applying one or more rules or conditions, or otherwise evaluating the health metric value against one or more criteria. This may include consideration of the expected burden/load placed on the resource by the request or other relevant factors related to the operation of the system containing the resource.

If the resource health value/level is sufficient (as suggested by the "Yes" branch of step or stage 436), then the requested task, function, or operation is performed (as suggested by process 442). Note that if the request has expired, then instead control may be returned to another element of the system.

However, if the resource health value/level is not sufficient (as suggested by the "No" branch of step or stage 436), then a process 438 is executed which calculates, determines or selects an appropriate sleep period or factor for the resource. This process may be of any suitable type, and may take into account one or more factors or parameters that characterize the resource, the system in which the resource is used, an operational state of the system, the account or class of accounts that generated the request, etc. In some embodiments, the process may be intended to accomplish a goal of generating a sleep or time-out period which satisfies certain operational criteria, such as with regards to decay behavior, overall system impact, impact on a specific system element, etc.

In one embodiment, the inventors have determined that a suitable function or process for determining a measure of the health of a shared resource is as follows.

In the example described, an Application determines a wait/sleep period based on applying a non-linear (asymptotic transform) factor to the amount of database time consumed by servicing or responding to a request:

Example Process/Function Suitable for Use in Determining Health Status or Metric
Input Parameters/Characteristics:
CPU Idle (percentage);
Garbage Collection Percentage (GC percentage)-garbage collection (GC) is a form of automatic memory management, utilized by programming languages for reclaiming 'garbage' no longer in use by the program. The GC Percentage refers to the amount of program time spent performing such activities, instead of application processing;
Session Count (range from 0-Threshold, where the Threshold value is configurable by machine type).
Apply a transform operation to each input (represented as a value between 0 and 1), wherein:

(1+INFLECTION^SLOPE)/(1+
 (INFLECTION/INPUT)^
 SLOPE)                AsymptoticTransform(SLOPE,
                         INFLECTION, INPUT):

FLOOR+(CEIL−FLOOR)*INPUT   LinearTransform(FLOOR,
                            CEIL, INPUT):

Combine the results as indicated to produce the final health value, using the following suggested example health formula:

HEALTH=AsymptoticTransform(3,0.25,CPU IDLE)*
 (1—AsymptoticTransform(3,0.25,GC PCT))
 *LinearTransform(0.4,1,1—SESSION COUNT)

Note that the parameter values chosen for evaluating the example Health function for a particular resource may be selected based on information about the shared resource and its functioning under a relatively high number or rate of access requests. For example, in the use case of a specific application, it might be observed that the database behaves well up to about 75% nominal capacity, and then degrades quickly. In such a situation, the Health function parameters may be selected in such a manner that the value of the function changes quickly just before this point.

Note that in some embodiments, one or more parameters of the health function may be varied to determine the desired behavior of the function, with the values selected based on one or more of the type of resource involved (e.g., a database or co-processor), the type of application which is requesting access to the shared resource (e.g., whether it is resource intensive, such as might occur with an application calculating real time profit margins), the use case for the resource access (e.g., batch processing or a single access request repeated multiple times), the type of data processing architecture or system involved (e.g., client-server, dedicated server, networked server, multi-tenant platform, distributed processing architecture, etc.), the user or account associated with the user (for purposes of prioritizing higher value users), total usage (for prioritizing those who are have not used the system extensively or have not exceeded their allotment or share), or susceptibility of the resource to overload, etc.

For example, although in some use cases a database may be operated at a relatively high percentage of its nominal capacity; in other use cases this may not be feasible or desirable. As one example, when using an ERP type application and a shared database, there may be computing architectures in which operation should remain at a lower percentage of nominal capacity in order to ensure that sufficient extra capacity is available to absorb situations such as a rapid increase in users or requests, a "spike" in needed database access for certain computations, etc. This may be of concern when operating a multi-tenant platform with a resource intensive application (such as an ERP application that utilizes a shared database), as such a use case may be subject to rapid fluctuations in resource access requests and having a sufficient operational "buffer" or safety net may be important to maintaining satisfactory operations for multiple users.

In one example embodiment, each application instance queries a shared database for a measure of its load every few minutes. A baseline value of the previous database system generated snapshot is compared to the current value(s) and cached in the application server (e.g., element 425 of FIG. 4(b)). Instead of querying the resource each time, a cached measurement may be used until the expiration of a predetermined period (its time-to-live (TTL) value, which is typically a few minutes).

In one embodiment, "sleep units" or increments of a sleep period are calculated on 3 linear scales depending on the range: "Green" for low usage (0 units), "Yellow" for medium usage (0-2) units, and "Red" for high usage (2-10 units). Each unit represents a multiple of the previous operation's SQL time that the application server should "sleep" before returning control. This may be applied to qualifying batch or automated contexts, such as Web Services Request or Scheduled Scripts (and typically not to UI processes). Note that some load problems may be of the "cup-overflowing" variety, where the behavior is acceptable up to a point or level, after which no more of a resource can be made available. The use of the non-linear levels or breaks described is an example of an accelerating autonomic concern regarding resource availability or proper system operation.

FIG. 4(c) through FIG. 4(f) are graphs illustrating the behavior of certain aspects of a data processing platform or system when operated in conjunction with an embodiment of the inventive shared resource access control process.

Figure 4C:
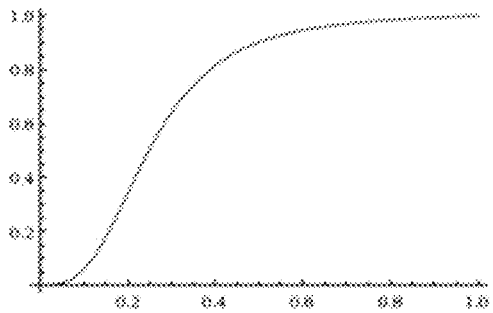

FIG. 4(c) is a graph illustrating a measure of the CPU IDLE. This represents the percent of central processing unit (CPU) capacity left unused at any point. In this sense it is a measure of the relative load placed on the CPU, in terms of use of its processing capacity. If the idle is to the left (say 20%), then health is towards the bottom. For different resource types (database vs. java, for example) different thresholds may be used, but an artifact of hyper-threading in the CPU (2 logical cores for 1 physical) is that CPU operation degrades quickly when more than half used. Thus, a sigmoidal/exponential transition is observed in the graph as CPU idle<60%, and quickly translates into degraded resource use and possibly poorer system performance. Note that a key aspect to interpreting the graphs is to recognize is that the output is always health.

Figure 4D:
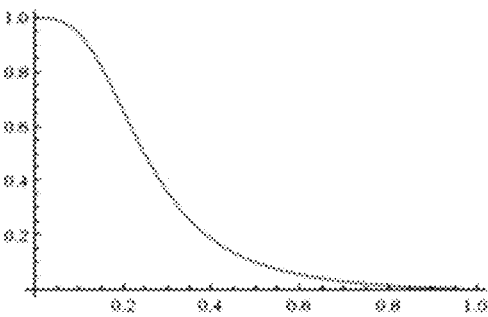

FIG. 4(d) is a graph illustrating a measure of the GC PCT (garbage collection %, as referred to previously). This represents the percentage of time the java virtual machine (JVM) is spending finding and reclaiming previously allocated, but now unused, memory, aka "collecting garbage". As the CPU does more of this task, it is less available for use in application processing. Furthermore, as it does more of this task, it is a sign that there is less headroom and there are more interruptions to performing the real work. As such, tolerance for it is very low and experience has shown that at a level over approximately 15%, performance degrades in a non-linear fashion (as the graph shows).

FIG. 4(e) is a graph illustrating a measure of the Session Count. This is a linear health metric. Servers have shown they can scale sessions in many cases, but the risk of running out of memory gets higher with each added session. As such, it is a measure for certain types of servers (such as eCommerce/shopping servers) which have a lot of lower memory and lower intensity sessions. This metric acts as an application level balance to the other CPU level checks.

FIG. 4(f) is a graph illustrating resource health as a function of the load metric in an Asymptotic Transform case. Note the rapid drop off through the critical section as parameterized by the function user.

Note that one or more of the (a) sleep function (that is, its form and behavior over time, or as a function of the number or rate of access requests, resource health status, account related data, etc.) or (b) the process for determining if a resource's health status/metric is sufficient to permit its access or use in generating a response to a request (e.g., a decision process used to determine whether a sleep period or time-out should be applied to a resource or to requests from an account or user to utilize the resource) may depend (indirectly or directly) on one or more of several parameters, factors, or characteristics. These include, but are not limited to:

a characteristic of the resource, such as its behavior under different loads;

a characteristic of the account, such as its historical use of a resource;

a characteristic of the user, such as their relative priority for certain resources;

a characteristic of the type of request, such as its expected resource utilization;

a characteristic of the state of the system of which the resource is a part or element, such as its expected behavior during certain times, load levels, etc.;

a specific data value of a business object of an account associated with the user, which may be indicative of the importance of the resource request to the user;

a real-time or pseudo real-time value of a data processing output of an application used to process business related data (e.g., ERP, CRM, eCommerce, HR, etc.), which may serve as a triggering mechanism for a change in priority or expected load, etc.; or a characteristic of the requesting client machine (whether designated for bulk or real-time traffic).

For example, certain users or accounts may have access to a resource at a certain level regardless of the health of the resource, that is, they are excluded from the described form of management or have a "dedicated" resource. In contrast, other users may have limited access to a resource for certain types of requests, during certain times or system loads, during times when the operating conditions for their account have certain values, etc. As a further example, if prior use has shown that users for a specific account may request access to a specific shared resource at an increased rate when certain metrics associated with that account (e.g., revenue, profit margin, the occurrence of a special event, etc.) have specified values or changes in value, then that information may be used to alter a sleep function or health or expected health level in order to better protect the resource from overload or failure.

Note also that different resources and different resources when coupled or integrated with different system elements may exhibit certain operational behaviors when under heavy loads, rapidly increasing loads, when other system or data processing operations are active, etc. In such cases, the expected behavior of those resources may be evaluated and used as part of determining the desired form and behavior of the sleep period or time-out function (such as by incorporating a rapid decay, exponential decay, delayed decay, etc.). In this way, the observed behavior of a resource under changing loads may be used to guide the determination or selection of a suitable sleep period function or health function in order to enable more optimal use of the resource without compromising its integrity (e.g., by constructing a sleep function that results in an increased likelihood of the resource entering a sleep period or a prolonged sleep period, as the resource's behavior is expected to become closer to overload, failure, etc.).

In one embodiment, the primary factors impacting the health of a resource are (a) CPU utilization and (b) session count. These correspond to the primary subsystems of CPU and Memory, and the impact of user requests on those subsystems. Note that CPU utilization tolerance is higher for a database vs. a java server because the former scales better with CPU, while the latter hits a "tipping point" and response time typically degrades sooner.

In one embodiment, the inventive system and methods enable placement of a "soft" limit on application servers and databases, in order to group them for purposes of managing resource use (i.e., in an operational but non-permanent way). A value of this approach is better cache hits (i.e., SQL result caching) and less churn of global resources (for example, a database connection pool). In order to implement this feature, the following are defined and/or utilized:

Affinity

Affinity between a program instance (JVM) and a database (DB) is computed in terms of the number of connections acquired by the JVM in a given period of time.

Grouping

The input to the grouping algorithm is the current state of the system, as represented by health and affinity metrics per JVM.

The output of the grouping algorithm is a map from DB to list of JVM with weights The goals of this approach and the resulting algorithm include the following:

(a) Preserve or increase affinity between JVM and DB;

(b) Balance compute load across the farm;

(c) Don't starve any user (such as a company or tenant); and (d) Avoid cascading failure scenarios.

A possible algorithm to use to achieve these goals is the following, although others are possible to use:

Round 1:
for each DB d with target group size t
   group<-First t JVMs from the list of eligible JVMs ordered by affinity for d
Round 2:
given the list of JVMs with a group membership of 0, ordered by health:
   add the 1st JVM to the DB group with the lowest average health
   add the 2nd JVM to the DB group with the 2nd lowest average health
   . . .
   add the Nth JVM to the DB group with the Nth lowest average health
Round 3:
given the list of DB groups ordered by mean health of the members in the group:
if the 1st group in the list is within 1 standard deviation of the mean health of all groups GOTO END
remove the first group from the list as u and the last group from the list as h
swap the least healthy JVM in u with the most health JVM in h
repeat
Update Frequency/Propagation Delays
The timing of update/calculation/polling intervals in the system should be arranged such that the outcome of one round of grouping can feed back into the subsequent round. To accomplish this, one possible scheme is:
15 second interval for reporting from JVMs;
15 second interval for polling from application function instance; and
45 second interval for group calculation.

Figure 5:
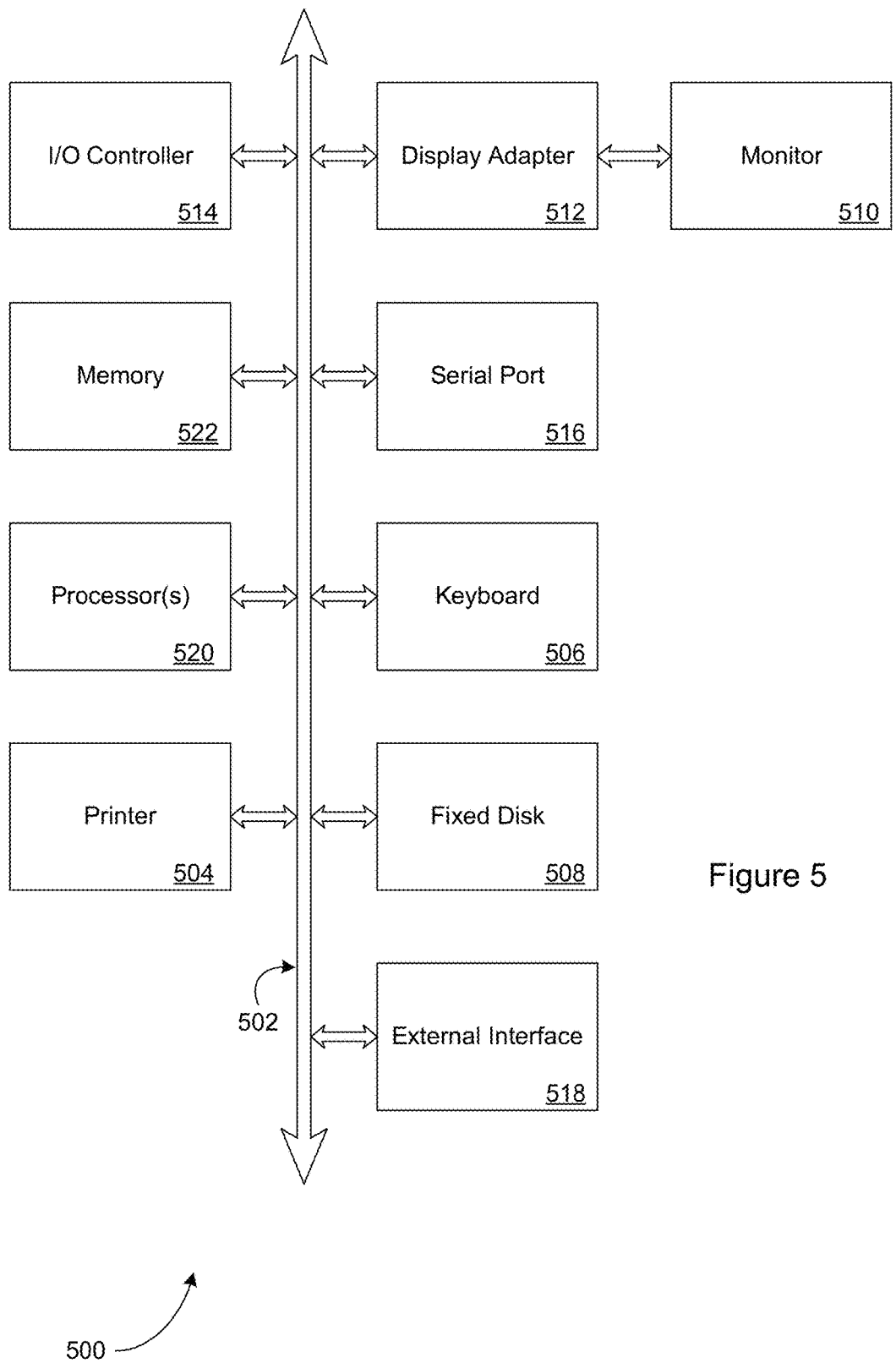
FIG. 5 is a diagram illustrating elements or components that may be present in a computer device or system configured to implement a method, process, function, or operation in accordance with an embodiment of the invention.

In accordance with one embodiment of the invention, the system, apparatus, methods, processes, functions, and/or operations for enabling governance of a shared resource may be wholly or partially implemented in the form of a set of instructions executed by one or more programmed computer processors such as a central processing unit (CPU) or microprocessor. Such processors may be incorporated in an apparatus, server, processing platform, client or other computing device operated by, or in communication with, other components of the system. As an example, FIG. 5 is a diagram illustrating elements or components that may be present in a computer device or system 500 configured to implement a method, process, function, or operation in accordance with an embodiment of the invention. The subsystems shown in FIG. 5 are interconnected via a system bus 502. Additional subsystems include a printer 504, a keyboard 506, a fixed disk 508, and a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 5 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:
1. A method of protecting a shared resource in a data processing system, comprising:
   receiving a request, wherein responding to the request requires use of the shared resource;

determining whether a previously established sleep period for the shared resource has expired;
responsive to determining that the previously established sleep period for the shared resource has expired, determining a health status of the shared resource, wherein the health status is determined based at least in part on (a) applying an asymptotic transform to a percentage of time that a CPU is idle and (b) applying a linear transform to a session count for the shared resource;
determining whether the health status is sufficient to permit responding to the request;
responsive to determining that the health status is not sufficient to permit responding to the request, calculating a sleep period for the shared resource based upon the health status of the shared resource and an expected resource utilization associated with a type of the request;
initiating a sleep state for the shared resource for a period substantially equal to the determined sleep period; and
responsive to determining a completion of the period, exiting the sleep state and responding to the request.

2. The method of claim 1, wherein the shared resource is one of a database, a processing element, or a connection to a network.

3. The method of claim 1, wherein the health status is determined by accessing data stored in a cache associated with the shared resource.

4. The method of claim 1, wherein the health status is determined by evaluating a function or rule set that is based at least in part on a characteristic of the data processing system.

5. The method of claim 1, wherein the data processing system is a multi-tenant data processing system.

6. The method of claim 5, wherein the multi-tenant data processing system includes one or more of an Enterprise Resource Planning (ERP) application, a Customer Relationship Management (CRM) application, or an eCommerce application.

7. The method of claim 6, wherein determining the sleep period for the shared resource further comprises determining the sleep period based on one or more of a characteristic of the resource, a characteristic of the account that generated the request, or a characteristic of the multi-tenant data processing system.

8. The method of claim 7, wherein the sleep period is determined by evaluating a function or rule set that is based at least in part on a value of a tenant's data that is associated with the ERP, CRM, or eCommerce application.

9. A data processing system, comprising: a central data storage element; and
an electronic data processor configured to execute a set of instructions, wherein when the instructions are executed, the data processing system is caused to implement a process to:
receive a request, wherein responding to the request requires use of a shared resource;
determine whether a previously established sleep period for the shared resource has expired;
responsive to determining that the previously established sleep period for the shared resource has expired, determine a health status of the shared resource, wherein the health status is determined based at least in part on (a) applying an asymptotic transform to a percentage of time that a CPU is idle and (b) applying a linear transform to a session count for the shared resource;
determine whether the health status is sufficient to permit responding to the request;
responsive to determining that the health status is not sufficient to permit responding to the request, calculate a sleep period for the shared resource based upon the health status of the shared resource and an expected resource utilization associated with a type of the request;
initiate a sleep state for the shared resource for a period substantially equal to the determined sleep period; and
responsive to determining a completion of the period, exit the sleep state and respond to the request.

10. The data processing system of claim 9, wherein the shared resource is one of a database, a processing element, or a connection to a network.

11. The data processing system of claim 9, wherein the instructions for determining the health status further comprise instructions that when executed cause the data processing system to access data stored in a cache associated with the shared resource.

12. The data processing system of claim 9, wherein the instructions for determining the health status further comprise instructions that when executed cause the data processing system to evaluate a function or rule set that is based at least in part on a characteristic of the data processing system.

13. The data processing system of claim 9, wherein the data processing system is a multi-tenant data processing system.

14. The data processing system of claim 13, wherein the multi-tenant data processing system includes one or more of an Enterprise Resource Planning (ERP) application, a Customer Relationship Management (CRM) application, or an eCommerce application.

15. The data processing system of claim 14, wherein the instructions for determining the sleep period for the shared resource further comprise instructions that when executed cause the data processing system to determine the sleep period based on one or more of a characteristic of the resource, a characteristic of the account that generated the request, or a characteristic of the multi-tenant data processing system.

16. A non-transitory computer-readable medium storing computer-executable instructions that when executed by at least a processor of a computer cause the computer to perform a method of protecting a shared resource in a data processing system, the method comprising:
receiving a request, wherein responding to the request requires use of the shared resource;
determining whether a previously established sleep period for the shared resource has expired;
responsive to determining that the previously established sleep period for the shared resource has expired, determining a health status of the shared resource, wherein the health status is determined based at least in part on (a) applying an asymptotic transform to a percentage of time that a CPU is idle and (b) applying a linear transform to a session count for the shared resource;
determining whether the health status is sufficient to permit responding to the request;
responsive to determining that the health status is not sufficient to permit responding to the request, calculating a sleep period for the shared resource based upon the health status of the shared resource and an expected resource utilization associated with a type of the request;

initiating a sleep state for the shared resource for a period substantially equal to the determined sleep period; and responsive to determining a completion of the period, exiting the sleep state and responding to the request.

17. The computer-readable medium of claim 16, wherein the sleep period is further calculated based upon a user or account from which the request originates.

18. The method of claim 1, wherein the health status is determined by applying an asymptotic transform to a percentage of time spent in memory management reclaiming garbage.

19. The data processing system of claim 9, wherein the health status is determined by applying an asymptotic transform to a percentage of time spent in memory management reclaiming garbage.

* * * * *